(12) United States Patent
Lipton et al.

(10) Patent No.: US 8,334,906 B2
(45) Date of Patent: Dec. 18, 2012

(54) VIDEO IMAGERY-BASED SENSOR

(75) Inventors: Alan J. Lipton, Herndon, VA (US);
Bruce Thompson, Great Falls, VA (US);
John I. W. Clark, Leesburg, VA (US);
Peter L. Venetianer, McLean, VA (US);
Zhong Zhang, Herndon, VA (US); Li Yu, Herndon, VA (US); Wei Hong Yin, Herndon, VA (US); Steve Titus, Herndon, VA (US); Amit Mistry, Reston, VA (US); James Morris, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 504 days.

(21) Appl. No.: 11/744,353

(22) Filed: May 4, 2007

(65) Prior Publication Data
US 2007/0285510 A1    Dec. 13, 2007

Related U.S. Application Data

(60) Provisional application No. 60/802,764, filed on May 24, 2006.

(51) Int. Cl.
*H04N 5/225* (2006.01)
*H04N 7/18* (2006.01)
(52) U.S. Cl. .... 348/169; 348/143; 348/155; 348/211.99
(58) Field of Classification Search .................. 348/169, 348/135, 143
See application file for complete search history.

(56) References Cited

U.S. PATENT DOCUMENTS

| | | | | |
|---|---|---|---|---|
| 5,555,512 A * | 9/1996 | Imai et al. | ...... | 702/127 |
| 5,574,762 A * | 11/1996 | Sato et al. | ...... | 377/6 |
| 6,389,168 B2 * | 5/2002 | Altunbasak et al. | ...... | 382/224 |
| 6,404,455 B1 * | 6/2002 | Ito et al. | ...... | 348/169 |
| 6,565,046 B2 | 5/2003 | Uebel et al. | | |
| 6,696,945 B1 | 2/2004 | Venetianer et al. | | |
| 6,766,035 B1 * | 7/2004 | Gutta | ...... | 382/103 |
| 6,970,083 B2 | 11/2005 | Venetianer et al. | | |
| 6,999,600 B2 | 2/2006 | Venetianer et al. | | |
| 7,203,338 B2 * | 4/2007 | Ramaswamy et al. | ...... | 382/103 |
| 7,437,007 B1 * | 10/2008 | Augustine et al. | ...... | 382/235 |
| 7,479,980 B2 * | 1/2009 | Merheim et al. | ...... | 348/152 |

(Continued)

FOREIGN PATENT DOCUMENTS

EP    1117081    7/2001

(Continued)

OTHER PUBLICATIONS

Regazzoni, C.S. et al; "A Real-Time Vision System for Crowding Monitoring," Robotics, Vision and Sensors, Signal Processing and Control, Maui, NOE. 15-19, 1993, Proceedings of the International Conference on Industrial Electronics, Control, and Instrumentation (IECON), New York, IEEE, US, vol. 3, Nov. 15, 1993, pp. 1860-1864, XP000437517.

(Continued)

*Primary Examiner* — Ngoc-Yen Vu
(74) *Attorney, Agent, or Firm* — Venable LLP; Michael A. Sartori; Todd R. Farnsworth

(57) ABSTRACT

A sensing device includes: a video imager to obtain video of an area; a processing unit to receive and process the video from the video imager to identify one of an event or a datum of interest; and a communication channel to output a non-imagery signal representing the event or datum.

41 Claims, 11 Drawing Sheets

U.S. PATENT DOCUMENTS

| | | | |
|---|---|---|---|
| 7,602,944 B2 * | 10/2009 | Campbell et al. | 382/103 |
| 2003/0096572 A1 | 5/2003 | Gutta et al. | |
| 2004/0247289 A1 | 12/2004 | Choi | |
| 2005/0146605 A1 | 7/2005 | Lipton et al. | |
| 2005/0162515 A1 | 7/2005 | Venetianer et al. | |
| 2005/0169367 A1 | 8/2005 | Venetianer et al. | |
| 2006/0062478 A1 * | 3/2006 | Cetin et al. | 382/232 |
| 2006/0066719 A1 | 3/2006 | Haering et al. | |
| 2006/0268111 A1 | 11/2006 | Zhang et al. | |
| 2006/0291694 A1 | 12/2006 | Venetianer et al. | |
| 2006/0291695 A1 | 12/2006 | Lipton et al. | |
| 2007/0013776 A1 * | 1/2007 | Venetianer et al. | 348/143 |
| 2007/0122000 A1 | 5/2007 | Venetianer et al. | |
| 2007/0127774 A1 | 6/2007 | Zhang et al. | |
| 2007/0153091 A1 * | 7/2007 | Watlington et al. | 348/208.14 |
| 2011/0134242 A1 * | 6/2011 | Loubser et al. | 348/143 |
| 2011/0285846 A1 * | 11/2011 | Lee et al. | 348/143 |

FOREIGN PATENT DOCUMENTS

| | | |
|---|---|---|
| GB | 2396945 | 7/2004 |
| JP | 11101502 | 4/1999 |
| WO | WO-2005066912 | 7/2005 |

OTHER PUBLICATIONS

International Search Report and Written Opinion of counterpart application No. PCT/US2007/010789, Mailed Dec. 19, 2007.

* cited by examiner

VIDEO IMAGERY-BASED SENSOR

CROSS-REFERENCE TO RELATED APPLICATIONS

This application is a non-provisional application claiming priority to U.S. Provisional Application No. 60/802,764, filed May 24, 2006, entitled "Intelligent Imagery-Based Sensor," the contents of which are incorporated herein in their entirety.

FIELD OF THE INVENTION

The present invention relates to sensor technologies for residential, commercial, and public space monitoring.

BACKGROUND OF THE INVENTION

This invention relates generally to sensing and monitoring of human space. Embodiments of the invention may include a sensor device that uses a video imager combined with a processor and intelligent image processing software to determine the presence of an activity or a condition in a scene being monitored. For example, the sensor can be used to detect the presence or absence of one or more people, a count of people in one or more areas, or a specific activity within one or more areas.

SUMMARY OF THE INVENTION

In an exemplary embodiment, the present invention may be a sensing device, including: a video imager to obtain video of an area; a processing unit to receive and process the video from the video imager to identify an event of interest; and a communication channel to output a non-imagery signal representing the event or datum. The identified event of interest may be of a type including at least one of: a detected human or object in the area, a counted human or object in the area, or an occupancy of the area.

The processing unit may process the video to identify at least two different events of interest, where a first identified event is of a different type than a second identified event. Video and/or imagery related to the signal may be output from the sensing device. The device may obscure the identity of any persons in the video and/or imagery output from the sensing device.

The sensing device may further include an output device, where the output device is at least one of a liquid crystal display, a light-emitting diode display, or an audio output. The sensing device may further include a communication driver to communicate with one or more devices or systems external to the sensing device. The communication driver may communicate with at least one of a television, a personal computer, a cell phone, a web client, a network storage, or a central monitoring system. The communication driver may communicate with one or more components of an energy management system, including an air/water heating component, a ventilation component, an air conditioning component, or a window treatment control component. The sensing device may be a stand-alone device. The sensing device may be a part of a remote monitoring system, a building automation system, an access control system, a business intelligence gathering system, an emergency responder system, or a traffic management system. The sensing device may be programmable to process the video and to identify at least one event. The sensing device may be reprogrammable to process the video and to identify the at least one event, and may be reprogrammable remotely. The sensing device may be programmable to set an area of interest or a tripwire within the area. The sensing device may detect the area of interest or the tripwire from the received video. The sensing device may further include an optical sensor to provide light level information to the processing unit. The video imager may be at least one of a color imager, a monochrome imager, a low light imager, a day/night infrared (IR) imager, a thermal imager, a thermal IR imager, a carbon-metal-oxide semiconductor (CMOS) imager, a charge-coupled device (CCD) imager, or special purpose video imager. The sensing device may further include an illuminator to illuminate the area with a range of light wavelengths, where the video imager is sensitive to the range of light wavelengths of the illuminator. The sensing device may further include at least one physical control to configure and/or calibrate the sensing device.

In another embodiment, the present invention may be a method of monitoring a scene, including: receiving video data about the scene from a video imager; processing the video data in a processing unit; identifying at least one event of interest based on the processed video data; and outputting a non-imagery signal representing the identified event. The identified event of interest may be of a type including at least one of: a detected human or object in the scene, a counted human or object in the scene, or an occupancy of the scene. The method may further include identifying at least two different types of an event of interest. The method may further include detecting occupancy by comparing a number of people entering the scene with a number of people leaving the scene. The method may further include outputting video and/or imagery related to the signal. The method may further include obscuring the identity of any person in the output video and/or imagery related to the signal. The method may further include outputting the signal to at least one of a remote monitoring system, a building automation system, an access control system, a business intelligence gathering system, an emergency responder system, or a traffic management system. The method may further include outputting the signal to at least one of one or more components of an energy management system, including an air/water heating component, a ventilation component, an air conditioning component, or a window treatment control component. The method may further include programming the processing unit remotely from the processing unit to detect the at least one event. The method o may further include programming the processing unit to set an area of interest or a tripwire within the scene. Programming the processing unit may include detecting the area of interest or the tripwire from the received video. The method may further include outputting the signal to at least one of a local computer, a television, a set top box, a router, a cellular telephone, a remote computer, or a remote monitoring center. The scene may contain at least one area of interest (AOI), and the method may further include: identifying at least one event of interest in the at least one AOI. The scene may contain at least two AOIs and the method may further include: identifying a first event that occurred within a first AOI and identifying a second event that occurred within a second AOI.

BRIEF DESCRIPTION OF THE DRAWINGS

The foregoing and other features of various embodiments of the invention will be apparent from the following, more particular description of such embodiments of the invention, as illustrated in the accompanying drawings.

DEFINITIONS

Figure 1:
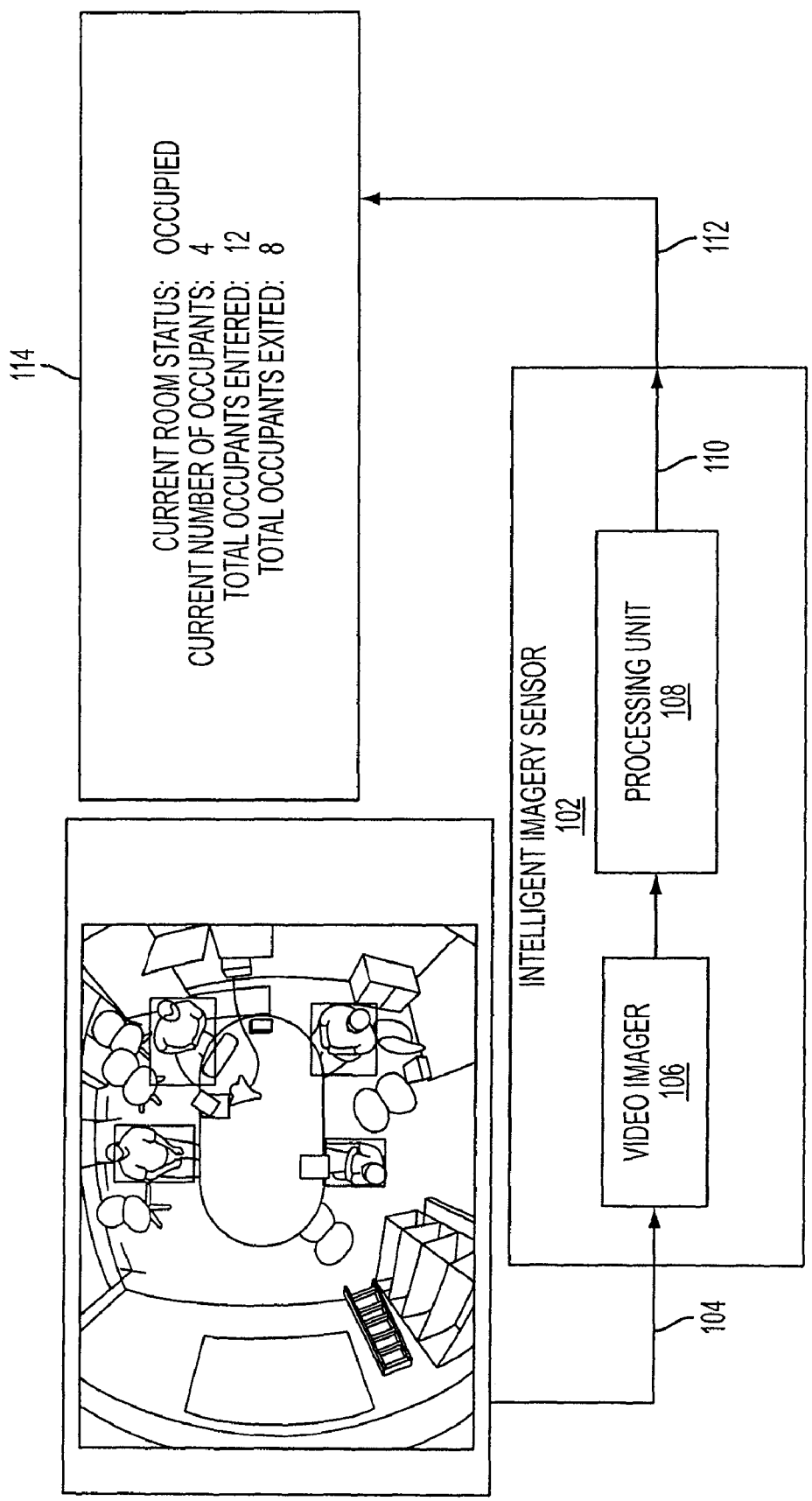
FIG. 1 shows an exemplary architecture for an exemplary intelligent imagery-based sensor (IIS)

In describing the invention, the following definitions are applicable throughout (including above).

"Video" may refer to motion pictures represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

A "video sequence" refers to some or all of a video.

A "video camera" may refer to an apparatus for visual recording. Examples of a video camera may include one or more of the following: a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a general purpose processor (GPP), a digital signal processor (DSP), an application-specific integrated circuit (ASIC), a field-programmable gate array (FPGA), a chip, chips, or a chip set; a distributed computer system for processing information via computer systems linked by a network; an optical computer; two or more computer systems connected together via a network for transmitting or receiving information between the computer systems; and one or more apparatus and/or one or more systems that may accept data, may process data in accordance with one or more stored software programs, may generate results, and typically may include input, output, storage, arithmetic, logic, and control units.

"Software" may refer to prescribed rules to operate a computer. Examples of software may include software; code segments; instructions; applets; pre-compiled code; compiled code; computer programs; and programmed logic.

A "computer readable medium" may refer to any storage device used for storing data accessible by a computer. Examples of a computer-readable medium include: a magnetic hard disk; a floppy disk; an optical disk, such as a CD-ROM and a DVD; a magnetic tape; and a memory chip.

A "computer system" may refer to a system having a computer, where the computer may include a computer-readable medium embodying software to operate the computer.

A "network" may refer to a number of computers and associated devices that may be connected by communication facilities. A network may involve permanent connections such as cables or temporary connections such as those made through telephone or other communication links. Examples of a network may include: an internet, such as the Internet; an intranet; a local area network (LAN); a wide area network (WAN); and a combination of networks, such as an internet and an intranet.

DETAILED DESCRIPTION OF THE EMBODIMENTS

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. Each reference cited herein is incorporated by reference. The examples and embodiments described herein are non-limiting examples.

FIG. 1 depicts a high-level block diagram of a sensor according to an exemplary embodiment. In an exemplary embodiment, an intelligent imagery-based sensor (IIS) 102 may be a relatively small device with a video imager 106, an on-board processing unit 108, and a communication channel 110, that performs a sensing function related to people or event sensing in commercial or residential premises and outputs a signal 112. Sensor 102 may receive video input 104 at video imager 106. Video imager 106 may be of any type (e.g., color, monochrome, low light, day/night infrared (IR), thermal, thermal IR, carbon-metal-oxide semiconductor (CMOS), charge-coupled device (CCD), or any special purpose video imager) and any resolution (e.g., from tens of pixels to mega-pixels). There may be applications for the inventive sensor in commercial and residential security; retail and public infrastructure business intelligence gathering;

building management; and public safety. More specifically, applications may include: energy management; space management; business intelligence; fire/life/safety; automatic door control; elevator control; healthcare; and/or monitoring.

Figure 2:
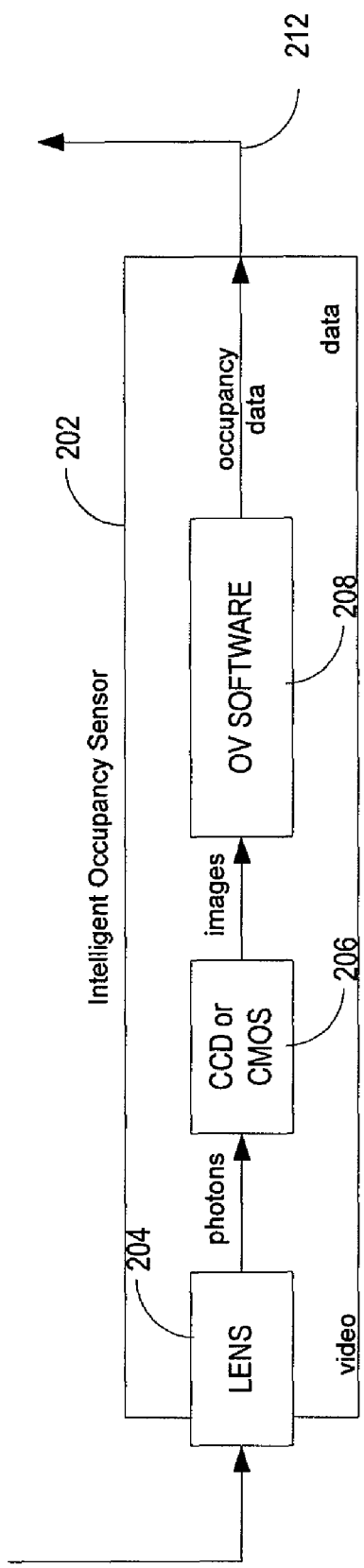
FIG. 2 shows an exemplary embodiment of an exemplary IIS.

FIG. 2 illustrates an exemplary embodiment of an IIS 202 for use, for example, for occupancy sensing. The video imager 106 may include a lens 204 and a charge coupled device (CCD) or CMOS 206. Processing unit 108 may include software and/or hardware 208. Signal 112 may include occupancy data 212.

One difference between embodiments of the IIS and a video camera (or a smart video camera) is that the output of the IIS may not be video imagery, but signal 112 representing an event 114 within the field of view of the IIS, or representing the state of the area monitored by the IIS. While video imagery may be used to determine characteristics of a scene or of objects within a scene, the video imagery itself may not generally be for human consumption, but for machine analysis or as an input or control of some other automated or semi-automated system. The sensor 102 may view the scene via the video imager, but as processing continues, the video information may be converted into numerical data, such as a single number representing the count of occupants in an area of the scene, from which the imagery cannot be restored. While the IIS device uses a video imagery and performs image processing as a sensing modality, it need not even be capable of transmitting imagery from the device, which may be an important privacy consideration.

Some exemplary differences between embodiments of the IIS and a smart camera include the following. First, the IIS is not necessarily a video device. It may use video as an input, but the output may be, generally, a signal. In some embodiments, the IIS may support video output as an option.

Second, embodiments of the IIS may be small, low-cost, and non-intrusive. Embodiments of the IIS may be designed not to look like a camera, but rather a small sensor (such as a PIR sensor, occupancy sensor, or smoke alarm). The reason for this design is that people tend to be concerned about privacy when they are being monitored by cameras. Embodiments of the IIS may be designed to be unobtrusive and not invade privacy.

Third, embodiments of the IIS may provide an output only when certain conditions are met. It may not stream imagery or other data on a constant basis.

Fourth, embodiments of the IIS may be reprogrammable to perform multiple different sensing functions while smart cameras tend not to be reprogrammable.

Although embodiments of the IIS may appear to be closely akin to conventional sensors, such as a passive infrared (PIR) motion sensor, an occupancy sensor, or an ultrasonic occupancy sensor, a number of differences exist. For example, an exemplary IIS is an image-based sensor, whereas the other conventional sensors use different sensing technology. Further, PIR and ultrasonic sensors are prone to false alarms because they are tuned to detect any motion or any warm object, respectively. An IIS may greatly reduce these false alarms because the IIS may use image processing to detect only the objects of interest. Moreover, embodiments of the IIS can work in many more environments because, by using imagery, most background noise (i.e., visual noise) can be ignored. In addition, embodiments of the IIS have the optional capability of delivering imagery. So, unlike other sensor modalities, if desired or needed, an operator can verify an alarm or view a scene under observation. Another difference between the IIS and traditional sensor technologies is that a single IIS device may monitor multiple areas within a scene, and may monitor for multiple types of applications. For example, a single IIS device may monitor one area of a scene for binary occupancy (i.e. is there someone there or not); and at the same time, the same sensor may monitor another area (with may be the same area, an overlapping area, or a completely disparate area) for occupant count (i.e. how many people are present).

Figure 3:
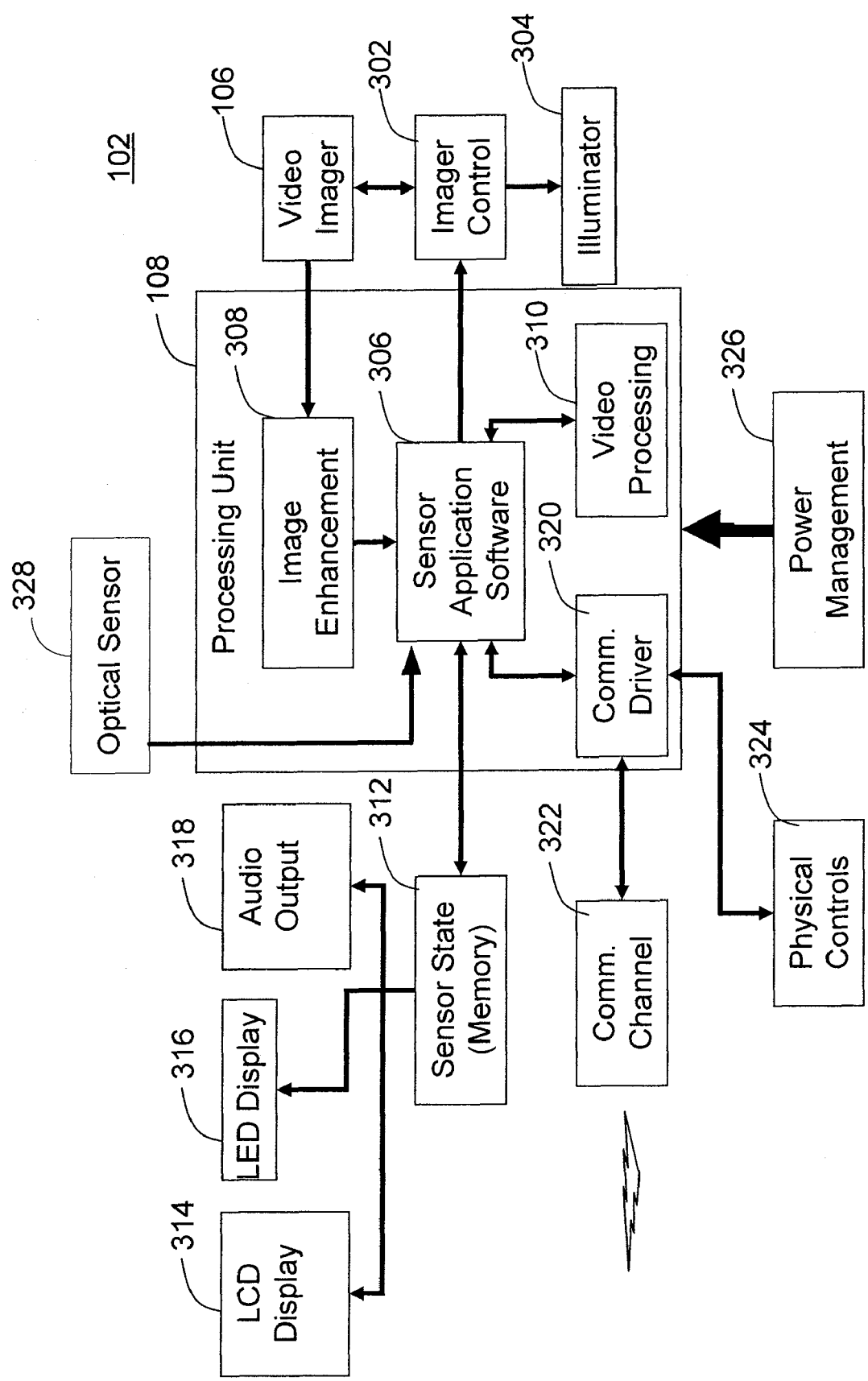
FIG. 3 shows an exemplary functional block diagram of an exemplary IIS.

FIG. 3 depicts an exemplary architecture of an intelligent image-based sensor 102. The sensor 102 may include computer vision software components that perform specific sensor functions. The hardware may include a video imager 106 with associated hardware components, a processor to perform video processing, memory to record state information, and input/output (I/O) components, including the ability to interact with at least one communication channel.

The sensor 102 may include a video imager 106, an imager controller 302, and an optional illuminator 304 for nighttime or darkness operation. The imager controller 302 may perform all control functions (e.g., auto-iris control, automatic gain control (AGC), illuminator control, or other imager functions). The illuminator 304 may provide visible or IR illumination depending on the application and imager capability.

The sensor 102 may also include a processing unit 108 that performs the video analysis. This processing unit 108 may be, for example, a general purpose processor (GPP), a digital signal processor (DSP), a micro-controller, an application-specific integrated circuit (ASIC), a field-programmable array (FPGA), or any other processing circuitry or hardware device. The processing unit 108 may optionally have an operating system running on it. The processing unit 108 may include sensor application software 306 to perform image processing and control device I/O functions. As images are captured by the video imager 106, the images may optionally be processed by image enhancement software 308. The image enhancement software 308 may perform such functions as, for example, noise reduction, de-interlacing, histogram equalization, software-based AGC, image stabilization, or other image enhancement functions.

Figure 4:
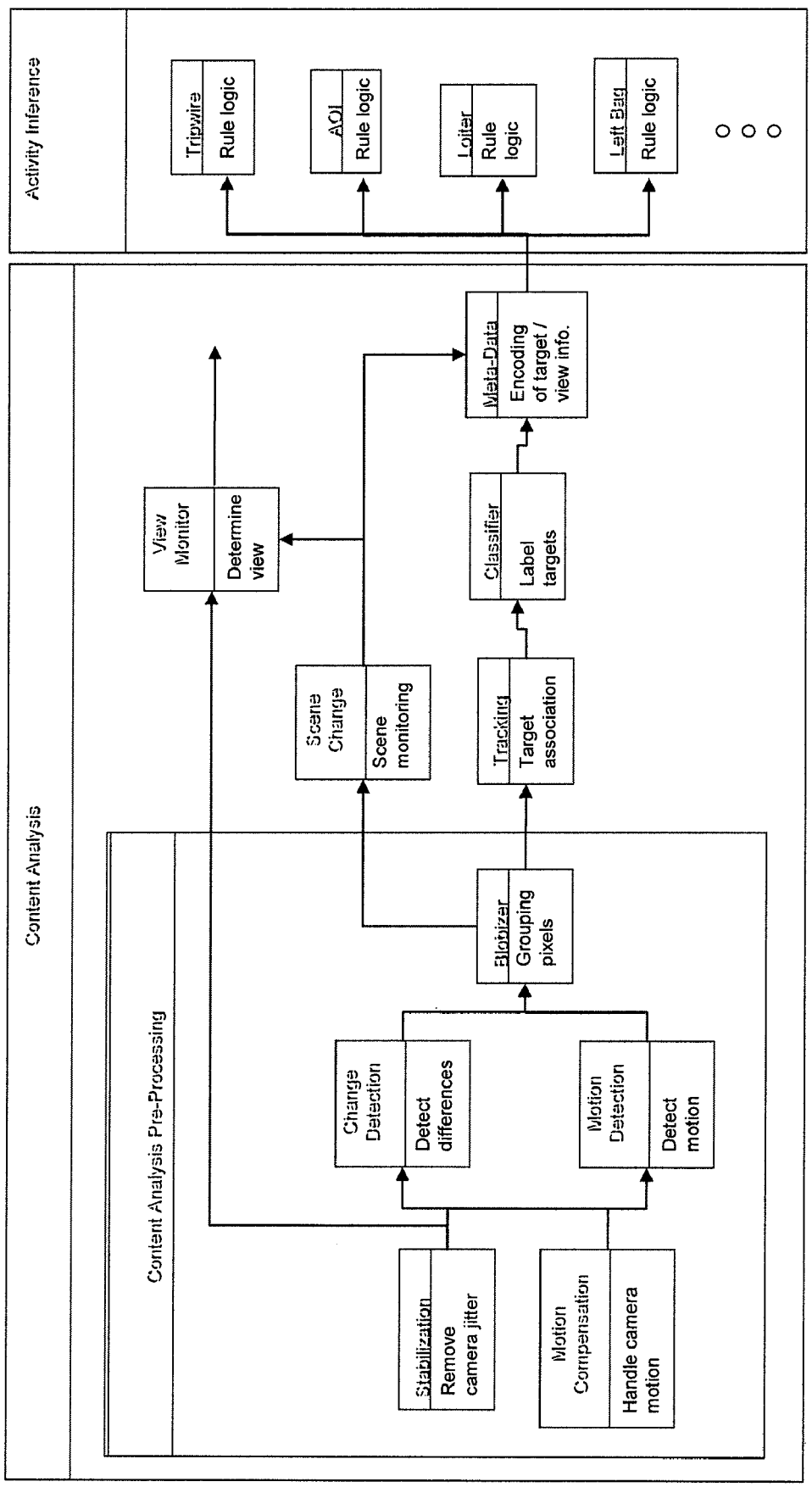
FIG. 4 shows exemplary paths of image processing functions that may be used by an exemplary IIS.

The processing unit 108 may also include video processing software 310 to perform video processing on a stream of images in real-time to determine if particular conditions are met. The conditions may include, for example, the entry of a human or other object, the continued presence of a human or other object, a count of humans or other objects, detection of an object performing a specific activity, or detection of a specific condition. Such algorithms are described in, for example, the following, which are incorporated herein by reference: U.S. Pat. No. 6,696,945, "Video Tripwire"; U.S. Pat. No. 6,970,083, "Video Tripwire"; U.S. Pat. No. 6,999, 600, "Video Scene Background Maintenance Using Change Detection and Classification"; U.S. patent application Ser. No. 11/288,200, "Detection of Stationary Objects in Video"; U.S. patent application Ser. No. 11/300,581, "Video Surveillance System Employing Video Primitives"; and U.S. patent application Ser. No. 11/139,986, "Human Detection and Tracking for Security Applications". An exemplary image processing pipeline to perform such functions is illustrated in FIG. 4.

The processing unit 108 may also include sensor application software 306 to communicate with internal or external memory 312 to store, for example, algorithm and system state information, alarm conditions, program code, representative imagery, and other such information. This internal state information may be displayed by the sensor 102 via a number of optional output devices such as a liquid-crystal display (LCD) 314, a light-emitting diode (LED) display 316, or an audio signal output 318.

Figure 10:
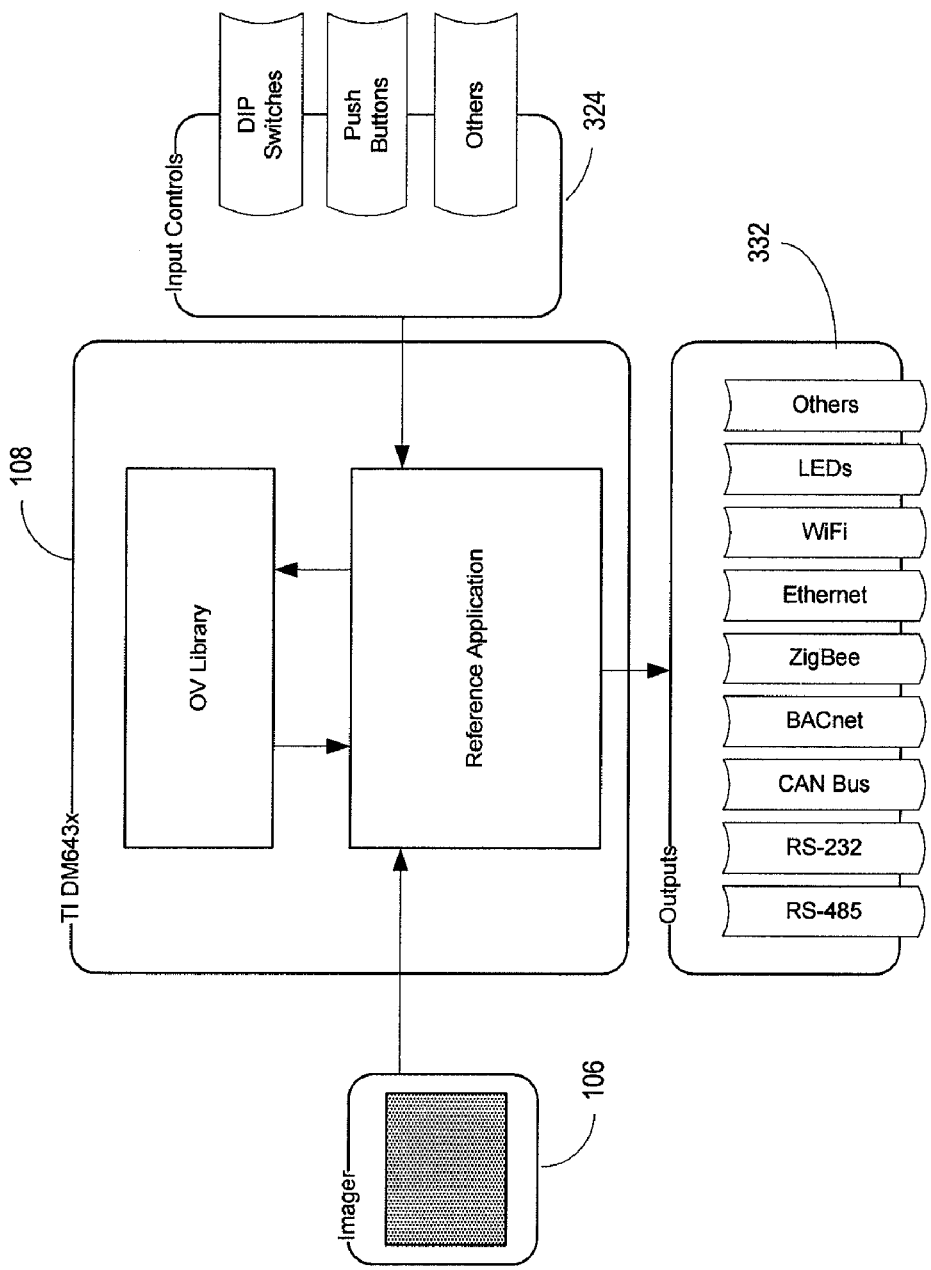
FIG. 10 shows an exemplary embodiment of an exemplary IIS.

The processing unit 108 may also include a communication software driver 320 for controlling communication with a communication channel 322. Through the external communication channel 322, the sensor 102 may receive configuration information and/or send alarm and/or state information. The alarm and/or state information may be sent from the sensor 102 to other back-end systems via the external communication channel 322. The external communication channel 322 may be, for example: a dry-contact switch; a serial RS232/485 channel; a CAN Bus channel; an Ethernet, wireless Ethernet, Zigbee, Power-line network, or any other network connection; a universal serial bus (USB) connection; a fiber cable connection; or any other standard or proprietary communication channel (see FIG. 10).

The communication driver 320 may also optionally communicate with physical configuration controls 324. The physical configuration controls 324 may include, for example, dip-switches, buttons, dials and other physical controls that can be used to configure the IIS (see FIG. 10). Configuration may include, for example: turning the system on and off; changing operational modes; setting algorithm parameters; or any other configuration setting. All of this configuration information may optionally be set remotely through the communication channel 322. This may be done via a published software SDK, API, or through a graphical user interface.

Embodiments of the IIS may also include a power manager 326 to perform power management. Embodiments of the IIS may be powered by, for example: one or more batteries; AC power; 24V DC power; solar power; kinetic power; parasitic power; power over Ethernet or any other type of power scheme.

The sensor 102 may include an optic sensor 328, which may provide information about the level of illumination.

The sensor application software 306 may include the following sensing functionality:

robust human, vehicle and/or object presence verification; accurate people, vehicle and/or object counting; and/or robust people, vehicle and/or object occupancy. In addition, the sensor may also include other sensing functionality such as daylighting (or artificial lighting) level detection; detection of light and shadow regions; accurate tracking and classification of people, vehicles, and/or objects within a scene; detection of human, vehicle, and/or object traffic patterns (see, e.g., U.S. Publication No. 2006-0066719A1); predictive modeling of people, vehicle, and/or object tracks (see, e.g., U.S. Publication No. 2006-0066719A1); detection of specific rule violations, such as for tripwires or other surveillance systems (see, e.g., U.S. Pat. No. 6,696,945, "Video Tripwire"; U.S. Pat. No. 6,970,083, "Video Tripwire"; U.S. patent application Ser. No. 09/987,707, "Video Surveillance System Employing Video Primitives"; U.S. patent application Ser. No. 11/057,154, "Video Surveillance System"; U.S. patent application Ser. No. 11/098,385, "Video Surveillance System Employing Video Primitives"; U.S. patent application Ser. No. 11/167,218, "Video Surveillance System Employing Video Primitives"; and U.S. patent application Ser. No. 11/300,581, "Video Surveillance System Employing Video Primitives"); and/or human slip and fall detection (see, e.g., U.S. patent application Ser. No. 11/165,182, "Detection of Change of Posture in Video"). Embodiments of the IIS may support any or all combinations of these functions. Embodiments of the IIS may be single-purpose, or multi-purpose, depending on the configuration of software loaded on to the device.

For human verification, embodiments of the IIS may be programmed to provide an alert when a human is detected in the field of view of the video imager 106. This alert may be output via the LCD display 314, the LED display 316 and/or the audio output 318 and/or transmitted as data via the external communication channel 322 to an onsite monitoring system or a central location such as described in, e.g., U.S. patent application Ser. No. 11/139,972, "Video-Based Human Verification System and Method."

In many applications, an exemplary IIS will be unable to display or transmit any imagery, so it will be difficult for an installer to configure particular area of interest (AOIs) or directional tripwires. To overcome this potential limitation, an exemplary IIS may include a hardware mechanism (e.g. push button, dip switch, or the like) to put it into a configuration mode. When in this mode, the processing unit may be used to track a configuration object, which may be, for example, a person, a light emitting diode (LED), or a configuration pattern (printed on paper). Alternatively, a radio frequency (RF) device or infrared (IR) device may be used as a trackable object. The configuration object may be observed by the IIS as the object moves around the scene and can thus be used to configure the system.

Figure 5B:
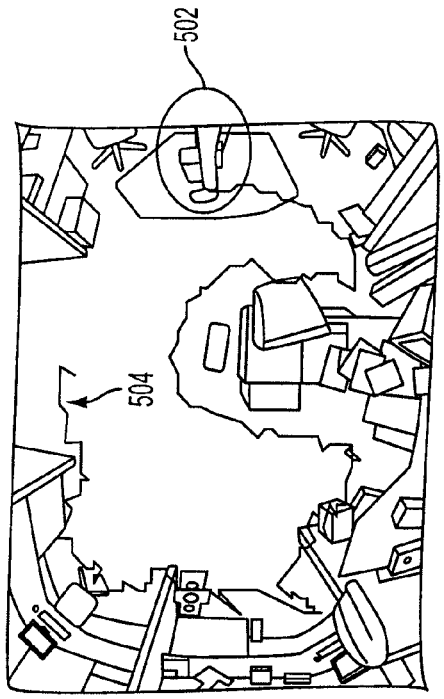
FIG. 5 shows an exemplary technique for configuring an area of interest in a scene.
Figure 5D:
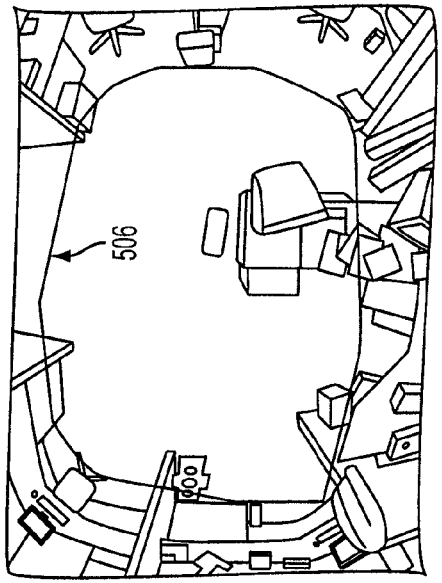
Figure 5A:
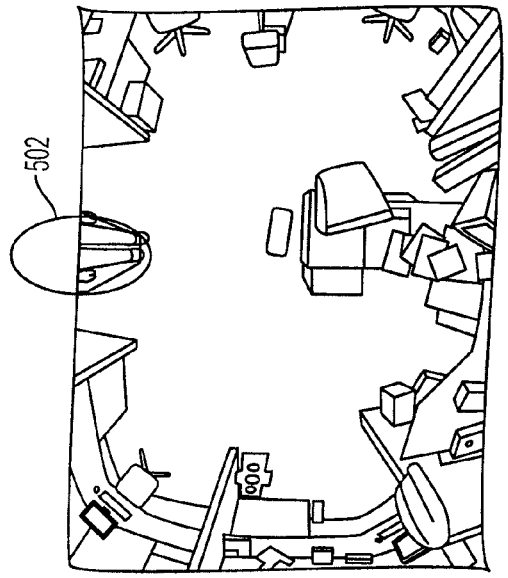
Figure 5C:
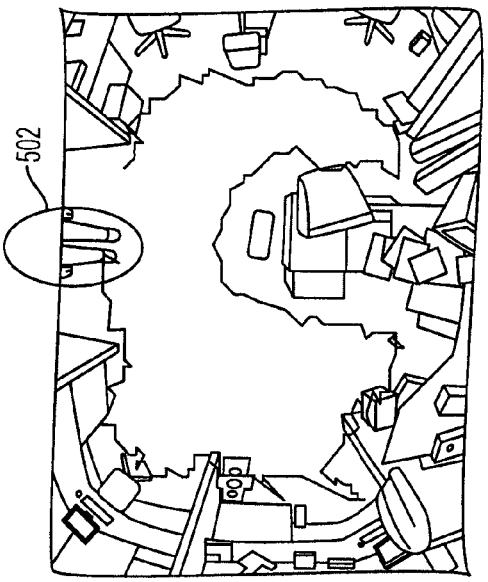

FIGS. 5A-D show an example of how configuration may be done by observation. FIGS. 5A-D show the view as seen by the exemplary sensor. In FIG. 5A, the installer 502 stands still for a period of time, e.g. 3 seconds, to indicate the start of an area. In FIG. 5B, the installer 502 walks a path 504 to form an area of interest (AOI). The processing unit may track the installer 502, for example, by tracking the feet of installer, and the location of the AOI waypoints may be at the feet of the installer. Tracking may be achieved, for example, by using the human tracking algorithm in U.S. patent application Ser. No. 11/700,007, "Target Detection and Tracking from Overhead Video Streams". In FIG. 5C, the installer 502 finishes the AOI and stands still for another period of time, e.g. 3 seconds, to indicate that the AOI is complete. In FIG. 5D, the AOI 506 is completed by creating, for example, a convex hull around the waypoints that the installer walked. Other contour smoothing techniques are also applicable.

Figure 6B:
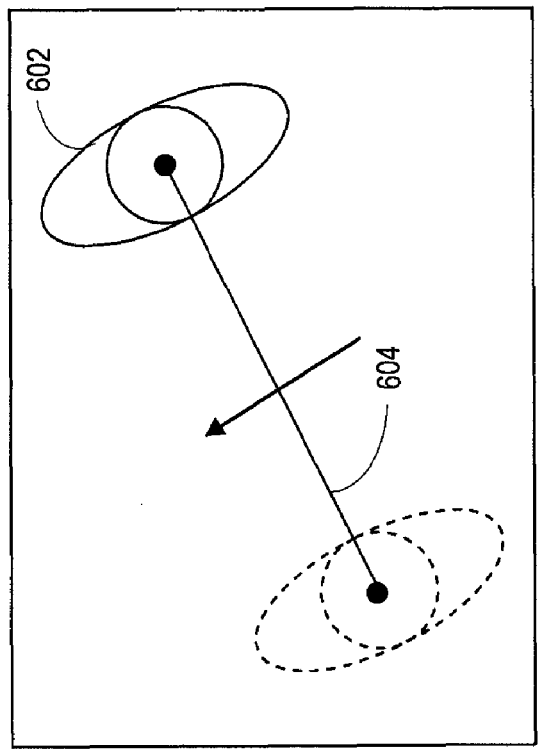
FIG. 6 shows an exemplary technique for configuring a video tripwire in a scene.
Figure 6A:
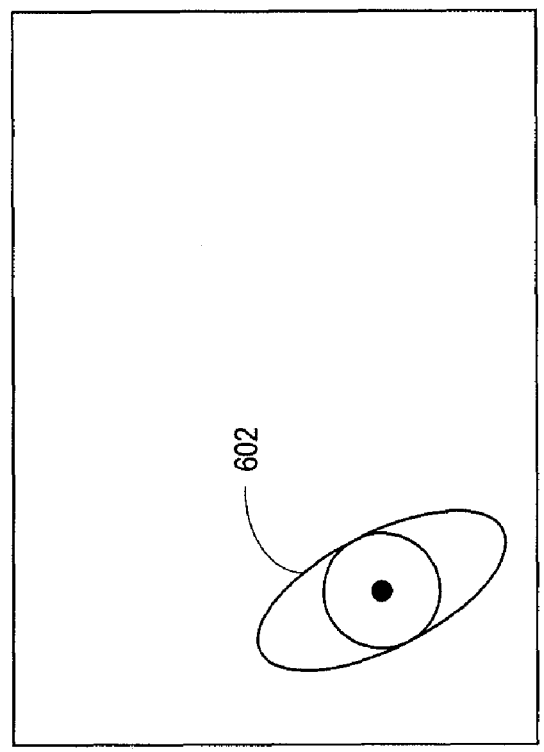

FIGS. 6A-B illustrate a similar technique that may be used to create a directional tripwire, for example, to be used for counting people entering and leaving a space. In FIG. 6A, an installer 602 could stand still for 3 seconds indicating the start point of a tripwire. In FIG. 6B, the installer 602 may walk the length of the tripwire and stop for 3 seconds, indicating the end-point of the tripwire 604. Directionality could be determined as being left-handed or right-handed—meaning that the tripwire will be detecting only objects moving from left-to-right or right-to-left based on the orientation of the installer when he set the tripwire. In FIG. 6B, tripwire 604 is a "right-handed" tripwire indicating that it will detect objects moving from right to left from the perspective of the installer.

Another aspect of a device such as the IIS device is that the video processing may sometimes require calibration, for example, as in U.S. patent application Ser. No. 11/700,007, "Target Detection and Tracking from Overhead Video Streams". In this case, the device may be manufactured with a fixed lens/imager combination so that intrinsic camera parameters will be known to the processing unit. However, unknown extrinsic camera parameters may still require calibration, for example, the height of the imager system and the angle of view of the imager system. There are many different ways of capturing this information. For example, the device could be placed in a "calibration mode" via a physical control such as a pushbutton or dip switch, and a known calibration pattern could be place on the floor of the space. The device could use a standard calibration technique to determine extrinsic parameters based on the pattern and provide some external signal such as an audio beep or LED output to indicate that calibration has been successful. In one embodiment of the device, the device may operate on a ceiling in a horizontal position—so only the height need be determined. This may be determined by setting appropriate physical controls such as dipswitches or dials on the device. In another embodiment, the device may be mounted on the ceiling in the corner of a room. In this embodiment, both height and angle may be required. To achieve this, physical controls may be used to determine height as in the previous embodiment, and the angle may be determined with a potentiometer or other dial control. The device may be configured such that when a mark on the dial is horizontal, the potentiometer (or dial) reading will be the angle of the device.

Exemplary Applications

One application using the human verification software is to detect human intruders into a space and to avoid producing false alarms when non-human objects appear in the scene (such as, for example, a vehicle, a house pet, or other clutter). Detecting the presence of one or more humans in a video stream may be accomplished using algorithms discussed in the following, which are incorporated herein by reference: U.S. patent application Ser. No. 11/139,986, "Human Detection and Tracking for Security Applications"; U.S. patent application Ser. No. 10/667,148, "Video Segmentation Using Statistical Pixel Modeling"; Ser. No. 10/667,148; U.S. patent application Ser. No. 09/987,707, "Video Surveillance System Employing Video Primitives"; U.S. patent application Ser. No. 11/057,154, "Video Surveillance System"; U.S. patent application Ser. No. 11/098,385, "Video Surveillance System Employing Video Primitives"; U.S. patent application Ser. No. 11/167,218, "Video Surveillance System Employing Video Primitives"; and U.S. patent application Ser. No. 11/300,581, "Video Surveillance System Employing Video Primitives".

For people and/or object counting, embodiments of the IIS may be programmed to count people and/or other objects (such as, for example, vehicles) entering and/or exiting a portal. Embodiments of the IIS may, for example display and/or transmit a signal when a person and/or an object is detected moving in either direction. Embodiments of the ISS may count people and/or objects moving in either direction; and/or provide a cumulative total of people and/or objects that are still within the portal (e.g., the number entering, and the number leaving). Counting people or objects entering an area and comparing that number to the number of people or objects counted leaving the area may provide another form of occupancy sensing. When the number of people entering is greater than the number of people leaving, then the area is occupied. This type of occupancy sensing may be helpful in situations where an area is occupied, but the occupants are not directly visible to the sensor, such as in a restroom with closed stall doors.

This application may be enabled by the use of multiple directional tripwires (described previously). Here a tripwire can be configured to count people entering the space and a tripwire can be configured to count people leaving the space. The difference in these two counts represents the occupancy of the space. Of course, it may be possible for the counts to go out of synch and for the device to register the presence of people when they are not there—or to think there is a "negative" occupancy of the space. To handle these problems, the IIS device can be programmed with some simple heuristics. If the count of people in the space false below zero, it can be set to zero. If the device registers the presence of people for a long time although no one has been detected entering the space for a long time, the device may have a configurable time-out. If this period of time is reached with no activity detected by the IIS device, the occupant count can be reset to zero.

As an application of the invention to business intelligence gathering, when desired or needed, embodiments of the IIS can determine how many people enter and/or leave a space in a given time. Counting people through a portal can be accomplished using techniques, such as those described, for example, in the following, which are incorporated herein by reference: U.S. Patent Publication No. US 2006-0291695, "Target Detection and Tracking from Overhead Video Streams"; U.S. Pat. No. 6,696,945, "Video Tripwire"; U.S. Pat. No. 6,970,083, "Video Tripwire"; U.S. Patent Publication No. US 2005-0146605, "Video Surveillance System Employing Video Primitives"; U.S. Patent Publication No. US 2005-0162515, "Video Surveillance System"; U.S. Patent Publication No. US 2005-0169367, "Video Surveillance System Employing Video Primitives"; U.S. Patent Publication No. US 2007-0013776, "Video Surveillance System Employing Video Primitives"; and U.S. patent application Ser. No. 11/300,581, "Video Surveillance System Employing Video Primitives".

For occupancy detection, embodiments of the IIS may be programmed to provide a signal if there are people (and/or other objects of interest) in the field of view of the sensor. Embodiments of the IIS may display or transmit a signal stating that there are people (and/or other objects) present or absent. As an option, a signal may be displayed or transmitted stating how many people (and/or other objects) are present. As an application of the invention to the automatic control of building management (or other systems), embodiments of the IIS can determine if people are present. Depending on occupancy, lights, water, heating/cooling, window treatment controls, and HVAC can be controlled; otherwise, lights and HVAC can be turned off to save power. Occupancy detection can be accomplished using techniques, such as those described, for example, in the following, which are incorporated herein by reference: U.S. Pat. No. 6,999,600, "Video Scene Background Maintenance Using Change Detection and Classification"; U.S. patent application Ser. No. 11/288,200, "Detection of Stationary Objects in Video"; U.S. patent application Ser. No. 11/300,581, "Video Surveillance System Employing Video Primitives"; and U.S. Patent Publication No. US 2006-0268111, "Multi-State Target Tracking".

As an option, the image enhancement software 308, sensor application software 306, communication software driver 320, and video processing software 310 may be implemented partially or fully in circuitry and/or firmware.

The invention can be used for a large number of applications, including for the following examples.

Energy management: Embodiments of the invention may be used to control indoor/outdoor lighting based on occupancy of a monitored space. Robust occupancy detection may be used for lighting controls. When people or vehicles are present, lights can be turned on or increased. When people or vehicles are absent, lights can be turned off or dimmed. For example, embodiments of the IIS may be used to more efficiently manage lighting in offices, conference rooms, hallways and corridors, common areas in offices such as kitchens and break rooms, rest rooms, parking lots and garages, and any other area where occupancy determines the need for lighting. Furthermore, a single IIS sensor can be used to control lighting in multiple areas (see FIG. 11). Different regions within the field of view of a single sensor may be associated with different sets of lighting controls and different lighting rules based on the occupancy of each of those regions.

Energy management: Embodiments of the invention may be used to control day-lighting. An important trend in energy management is day-lighting, where natural daylight is used to replace or augment artificial light. Embodiments of the IIS may be used to sense natural and artificial lighting levels, for example, with one or more optical sensors 328, in different regions of a scene, as well as lighted and shadowed regions within a scene, and may be used to control artificial lights and controllable window/skylight treatments to obtain the desired mix of natural and artificial light within one or more regions of the scene.

Energy management: Embodiments of the invention may be used to control predictive lighting. Embodiments of the IIS may be used to model common patterns of human or vehicular traffic flow through a scene (see, e.g., U.S. application Ser. No. 10/948,751, "Method for Finding Paths in Video") and control lighting levels based on predicted motions of people or vehicles through a scene. For example, embodiments of the IIS may control lighting in warehouses, storage spaces and fulfillment centers, where workers moving materials or driving heavy equipment would benefit from lights automatically turning on to light their path. Given that the IIS is an imagery based sensor, there may be situations where the lighting levels are too low for the sensor to determine occupancy. In these cases there are several modifications to the standard embodiments of the IIS that can be employed. The IIS device can have in-built or external infrared (IR) illumination and an IR-sensitive imager. The IIS device may rely on other sensing modalities (in-built or external) to turn on the lights—such as PIR or ultra-sonic. The IIS may include a thermal imagery sensor that can detect objects in dark scenes.

Energy management: Embodiments of the invention may be used to control HVAC. Embodiments of the IIS can be used to determine simple binary occupancy of one or more regions within a scene for the purpose of controlling HVAC. Knowing where each person is within a scene allows for very high precision control of airflow through a space with minimum energy wastage. Additionally, embodiments of the IIS may be used to determine the accurate count of people in a space to allow more fine-grained control of the HVAC system. Knowing that there are many people in a space provides useful information to the HVAC system to reduce the temperature in that space (because people produce heat energy)—while having few people may indicate a need to raise the temperature.

Space management: Embodiments of the invention may be used to plan the usage of space. Many corporate real estate (CRE) organizations tasked with managing million- or even billion-dollar leases do not have an effective way to measure and understand the actual use of space. Knowing where, when, and how users actually interact with space increases the likelihood of providing them with a highly effective asset, tuned to their needs. Real-time actual use of space (AUS) data enables CRE managers to make better space planning decisions, such as when additional conference rooms are needed, or when to divest of underutilized space.

Space management: Embodiments of the invention may be used to manage daily utilization of space. Some organizations use a workplace management tool to reserve individual workspaces and conference rooms. Embodiments of the IIS may feed real time occupancy counts on a per-room basis to workplace management software, improving the accuracy and efficiency of workplace space management.

In one space management embodiment, the IIS may be coupled to a room reservation/utilization system such as MICROSOFT OUTLOOK, from Microsoft Inc. of Redmond, Wash., USA, or POLYVISION ROOMWIZARD (http://www.polyvision.com/products/roomwizard.asp). In this integration, the IIS device may be used to confirm that people are truly present when a conference space has been booked. If no one is present at the reserved time, the room is returned to the pool of available resources. Furthermore, the room reservation system may use the IIS device to gather statistics as to the utilization of spaces that can be compared with the data from the reservation system.

Business Intelligence: Embodiments of the invention may be used to measure customer traffic patterns. Measuring customer traffic patterns is increasingly important for retailers and other applications. Embodiments of the IIS may be used for real-time monitoring to measure customer presence, entry and exit patterns, counts, and dwell time. This data may be used to model the best location for staff, or to detect and report on overflow conditions for improved customer experience. This data may also be used to determine display effectiveness for mobile displays and end-caps, enabling retailers the opportunity to maximize revenues with more effective product placements. Other business intelligence applications include banking applications where the sensor may be used to monitor automated teller machines (ATMs), to determine dwell-times of people in queues, and so on. Additionally, embodiments of the IIS may determine accurate vehicle counts in parking garages, for example, by counting vehicles that enter and exit a parking lot, allowing management to control "lot full" signs, direct traffic quickly to open spaces, and reconcile parking lot receipts. Business intelligence monitoring results may be stored on a PC or other back-end device(s). The results may be tabulated and used to generate statistical reports. Overall, pattern management and other data can help businesses make better decisions and better manage their assets.

Fire/Life/Safety: Embodiments of the invention may be used to count and locate people in a building during an emergency, especially an emergency requiring evacuation of the building. In emergency situations, it would be extremely beneficial to have an accurate snapshot of not only how many people are in a building, but where they are actually located. Embodiments of the IIS may be placed strategically in a facility such that data can be transmitted over a wired or wireless network for integration with facilities management software. This data may be consolidated to create a real-time view of actual building occupancy for mustering purposes in an emergency. This real-time information may help emergency staff vacate premises more quickly and efficiently, and alert them if previously secured areas become occupied. For a first responder system, embodiments of the IIS data may be sent directly to first responders in the case of an emergency so they can determine where people are and plan their actions accordingly.

Another potential safety and security application is an "n-man rule" application. There are many environments where it is mandated that there be only "n" people in a space, or "no more than n," or "no fewer than n". For example, in a disease control lab, there must be at least n=2 people in a lab space at all times. For example, in a bank vault, there can be no more than n=3 people. For example, in the weapons hold of a nuclear submarine, there must be only one person at any time. The IIS device can be used to enforce such rules by determining occupancy of a controlled space.

Automatic Door Control: Embodiments of the invention may be used to control automatic doors. Automatic doors are increasingly pervasive in commercial and retail settings. Sensors for these systems are typically able to only detect presence near the door and result in many wasted opening and closing operations, leading to considerable energy loss. Moreover, many do not consider the area that the doors slide into or open toward, creating a safety hazard. Using the IIS, door systems may be made far more effective. A single sensor may monitor traffic flows leading up to the door, ensuring that the doors are opened when necessary and left closed for passersby. In addition, hazard zones created by doors in motion may be monitored for human presence such that doors are operated only when it is safe to do so.

Elevator Control: Waiting for an elevator can be an extremely frustrating experience. Being an occupant in a crowded elevator and stopping on every floor can be equally painful. Embodiments of the invention may be used to improve a person's elevator experience. Exemplary sensors placed outside elevators may be used to detect the actual number of people waiting. With this information, elevators may be routed more efficiently. Sensors placed inside the elevator may detect the actual amount of free space and stop accordingly. When no more people can fit in the elevator, the elevator may be routed to destinations as set by its occupants rather than stopping at each floor to pick up more.

Healthcare: Many challenges exist in providing for the safety and comfort of an aging population. In many cases, patients in skilled-care facilities require special monitoring and attention that stretches staff capacity. Embodiments of the invention may be used to help watch for specific events that may require urgent staff attention. Such applications include: monitoring an area to ensure that patients do not leave their rooms by way of an open window or doorway to the outside (elopement); detecting and notifying that a patient is unexpectedly out of bed and moving around the room (evening monitor); detecting when a patient has entered a room that is not his own, or when a patient has unexpectedly left her own room (security), especially for patients suffering from dementia, who can become confused and enter the wrong room, creating unsafe conditions for themselves and others; detecting whether the person enters the kitchen regularly; detecting whether the person get out of bed regularly; and detecting patients who have fallen (slip and fall), especially in cases when the patient is unable to reach the device normally used to request assistance.

Further, in health care environments a fundamental requirement is patient privacy. Embodiments of the IIS may help protect patients because there may be no transmission of images—only data that describes occupancy or events.

Residential Monitoring: The traditional approach to home security involves contact-closure systems feeding alarm panels which are monitored by professional services companies for a monthly subscription fee. The downside to these systems is the incredibly high (90-99%) false alarm rate and absence of video verification. The financial burden incurred by responding to false alarms is quickly being passed from local law enforcement to the alarm system owner. In parallel, a number of new video-based solutions are being introduced, designed for home owner installation. Both approaches can benefit by including an exemplary IIS. These devices may detect human presence by analyzing video information, an approach that may result in near 100% detection with no false alarms. Moreover, all detections may be transmitted with visual information, facilitating verification prior to sending responders.

Security and Privacy: Embodiments of the IIS may provide an added advantage of enhanced security, especially in outdoor scenarios. Any activity in a monitored area may trigger lights to turn on, which gives the perception that the area is being watched. In addition, if required, such triggering information may be logged, along with the picture of the target, for future review, or the information may be sent to an on-duty guard for follow up.

The number of cameras being used in offices, cell phones, and other handheld devices has increased significantly in recent years. Consequently, privacy is becoming a real concern and must be addressed for a device to be widely accepted in the market With a camera, there is a potential to stream video out of the sensor, especially if it is wirelessly connected. Embodiments of the IIS may include measures to avoid unauthorized or malicious use of imagery and protect the user against tampering with the device. In embodiments of the IIS, the imagery may only need to be exposed during setup, for example, to define the area of interest and to associate image locations with appliance usage.

Exemplary IIS devices may be designed to provide additional privacy by preventing imagery from ever being transmitted from the device and/or by making it impossible to transmit imagery from the device. Imagery may be fed directly into the processing unit from the imager, and there may be no physical path for imagery to leave the device. If an embodiment of the device is required that DOES allow imagery to leave the device, the transmitted imagery can be configured so that the identity of individuals in the image is digitally obscured by any standard means (blurring, blocking out the pixels, etc).

For transportation system intelligence gathering, embodiments of the IIS may determine the number of people that enter and exit each station in, for example, a railway system, which may help define passenger traffic patterns.

For public space and/or event data gathering, embodiments of the IIS may count people who enter and exit a public event, such as a sports arena or a concert, which may be useful information for event organizers and advertisers.

For access control, an IIS may count the number of people that walk through a doorway (and ignore other objects, such as carts and dollies) and may integrate with an access control system (such as, for example, a security card or key system). Embodiments of the IIS may measure the number of people who travel through a portal using imagery of the portal. By combining an IIS with an access control system, enforcement of access control policies may be possible, such as: ensuring only one person per access control event; ensuring only a specified number of people per access control event; or enabling some security cards to allow multiple people through while other cards only allow one person access.

For traffic management, an IIS may be used. Typically, inductive loops are used to detect when vehicles are present at intersections, but these have a number of disadvantages. For example, inductive loops require major road works to install and maintain, cannot tell how many vehicles are present, and are not sensitive to smaller vehicles such as bicycles or motorcycles. An IIS may address all of these problems. Embodiments of the IIS may be able to ascertain that there is a vehicle waiting at the traffic signal (even if it is only a bicycle) and, thus, be used to control the traffic signals. Further, embodiments of the IIS may be able to determine how many vehicles are waiting and, thus, be used to time the traffic signals. A short green light occurs if there are few vehicles, and a longer green light occurs if there are more vehicles.

Embodiments of the IIS system may be designed to generate output that is not directly for human consumption, although it may deliver imagery if required. Consequently, embodiments of the IIS may be able to interface with many other different kinds of systems as a data source for various automated control schemes. Examples of such automated control schemes include: a stand alone system; a do-it-yourself kit; a remote monitoring kit; a building management system; an access control system; a business intelligence gathering suite; and a first responder system.

For a stand alone system, embodiments of the IIS may be used as a stand-alone device. If an embodiment of the IIS is performing human detection, the IIS may generate an audio alarm from audio output 318 if it detects someone, or it can display an LED on LED display 316 or text on the LCD display 314. If an embodiment of the IIS is performing people counting, the IIS may display a count on the LCD display 314 or an audio numeric count from the audio output 318. If an embodiment of the IIS is performing occupancy sensing, the IIS may show on the LED display 316 an indication denoting that people are present or absent, or the IIS may depict occupancy on the LCD screen 314 or as an audio signal from the audio output 318.

Figure 7:
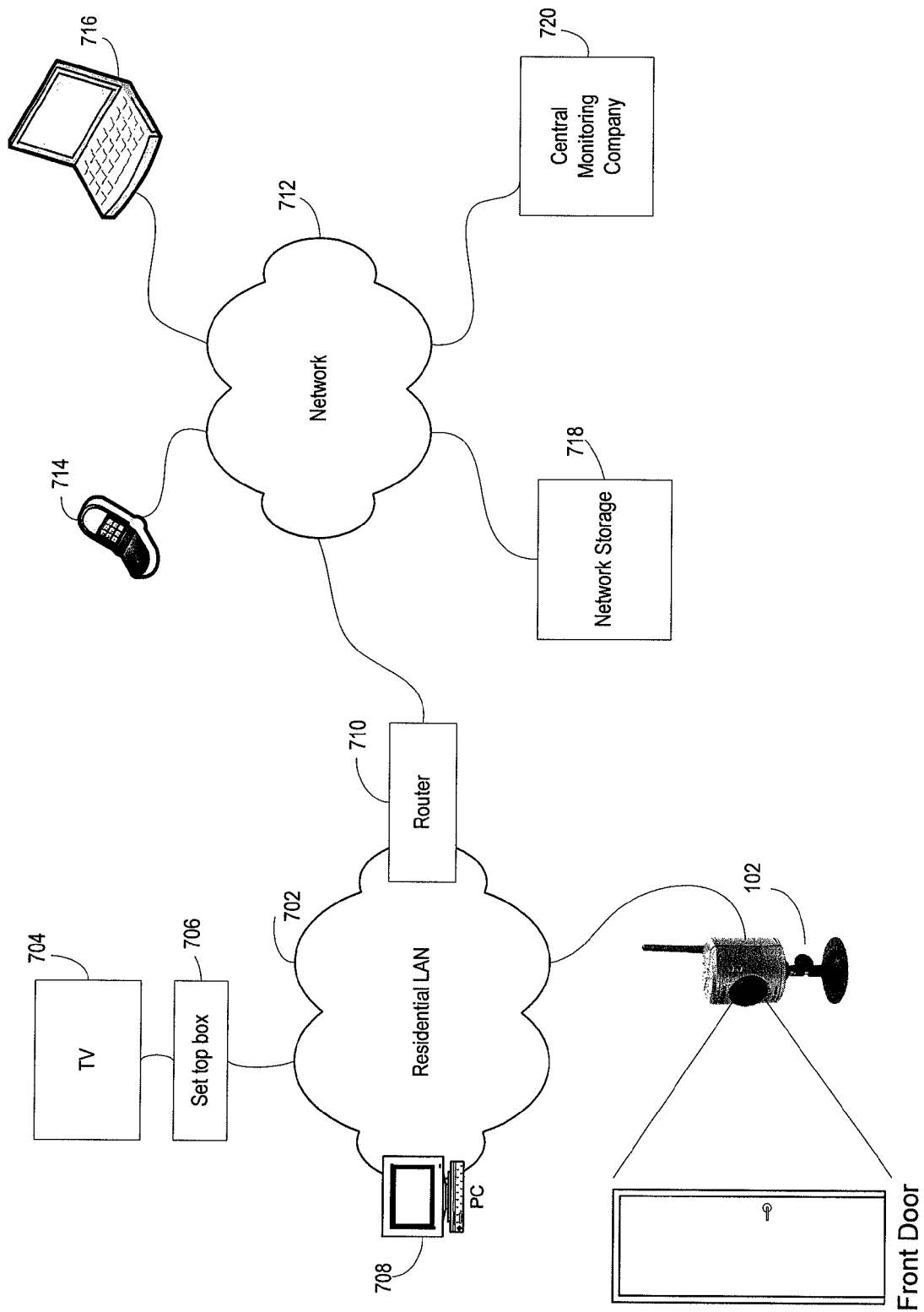
FIG. 7 shows an exemplary installation for an exemplary IIS.

For a do-it-yourself kit or a remote monitoring kit, embodiments of the IIS may be placed around the home or office and configured to detect particular types of events. Alerts and/or information may be sent by the IIS via a number of different mechanisms. FIG. 7 shows exemplary connections for an embodiment of the IIS installed in, for example, a home or small office. The IIS 102 may monitor, for example, the outside of a front door. The IIS may be connected via a residential local area network (LAN) 702 to a television 704 (TV), a set top box 706 (STB), a personal computer 708 (PC), and a router 710. The router 710 may be connected via a network 712, e.g., the Internet, to a cell phone 714, a web client 716 (e.g., a laptop computer), network storage 718, and a central monitoring company 720 (CMC).

Figure 8:
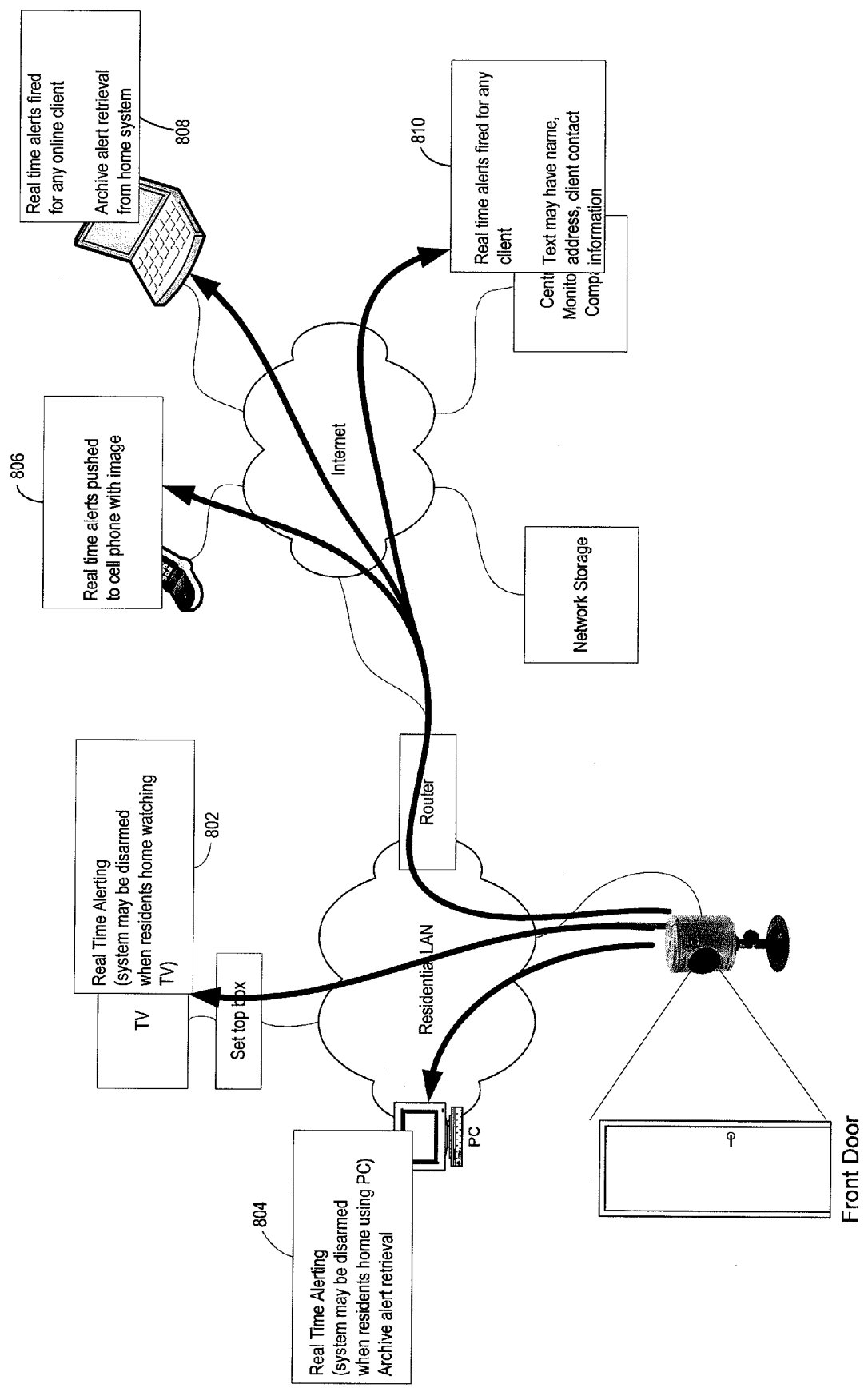
FIG. 8 shows exemplary alert paths for the sensor of the invention.

FIG. 8 shows exemplary alert paths for the exemplary connections illustrated in FIG. 7. A first alert 802 may be sent to the TV via a STB configuration. Alert 802 may, for example, display a text alert or an image of the scene directly onto the TV. A second alert 804 may be sent to a home computer connected to the IIS device, causing, for example, a graphical user interface window to open and display an alert and/or a video image of the scene. A third alert 806 may be sent over the Internet to a web-attached PC via a hosting service and a web-portal. A fourth alert 808 may be sent as an information push to a mobile device, such as a cell phone or a personal digital assistant (PDA). A fifth alert 810 may be sent to a monitoring service or law enforcement office to verify the alarm and dispatch responders, if necessary.

Figure 9:
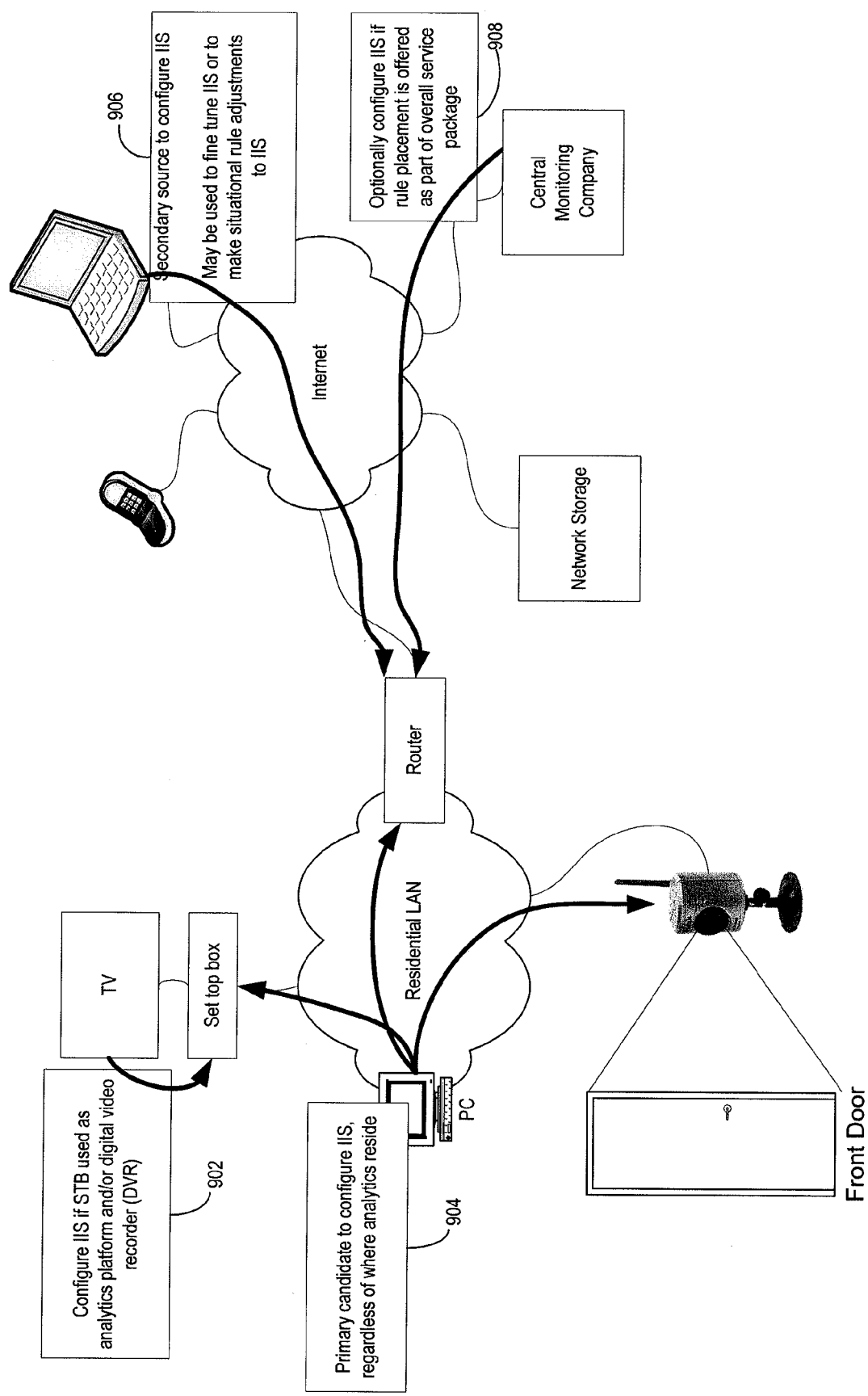
FIG. 9 shows different paths for configuring the sensor of the invention.

FIG. 9 shows different exemplary paths for configuring the IIS, if configuration is necessary. However, configuration may not be necessary when human verification technology is employed. Such human verification technology is described in, for example, the following, which is incorporated herein by reference: U.S. patent application Ser. No. 11/139,986, "Human Detection and Tracking for Security Applications". As a first path 902, the IIS may be configured on a TV via an STB menu. As a second path 904, the IIS may be configured on a home PC by web-based software or a local client. As a third path 906, the IIS may be configured by a web-application via the Internet. As a fourth path 908, the IIS may be configured from a remote monitoring or law enforcement location via a web application or a remote client.

Figure 11:
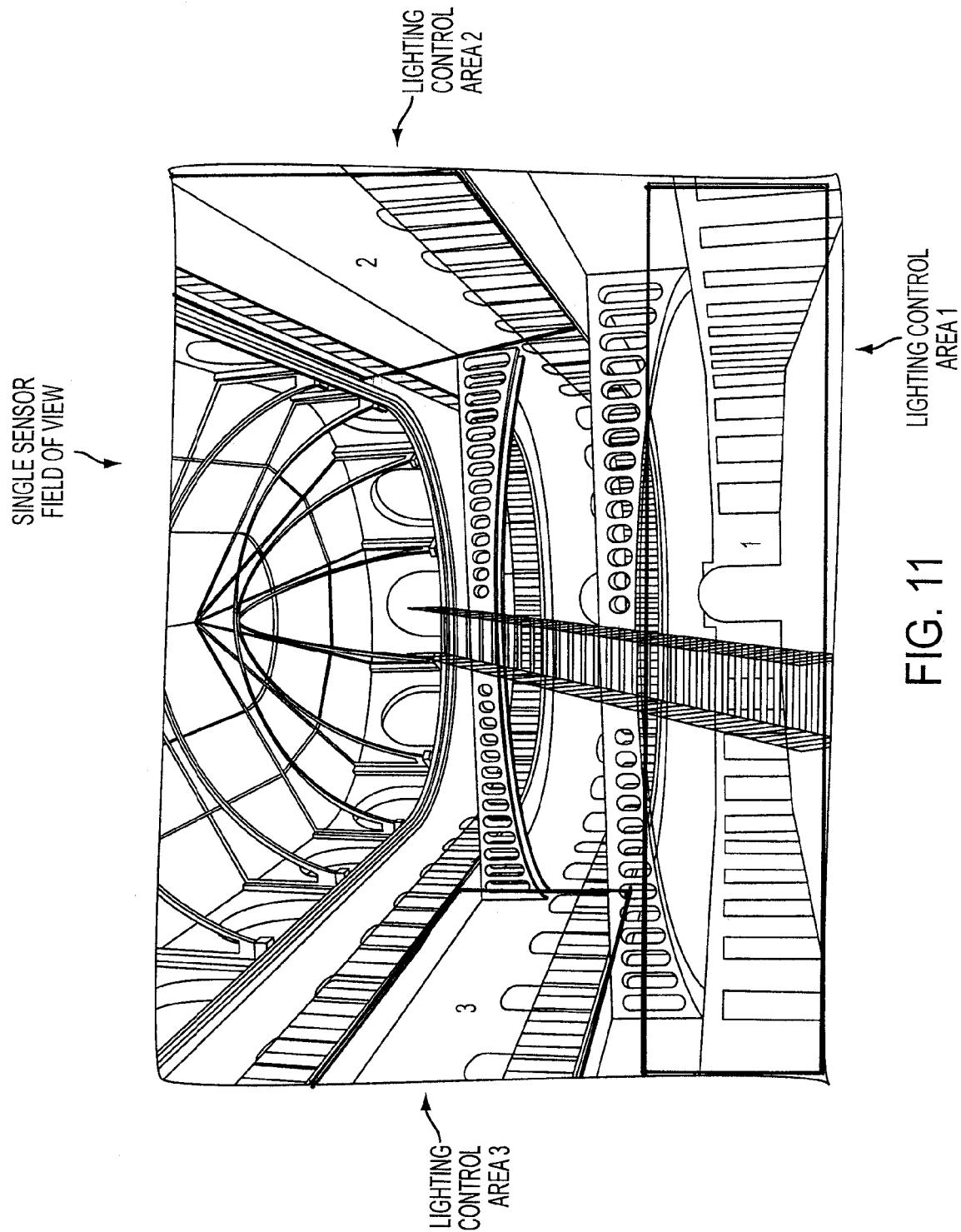
FIG. 11 shows an exemplary single field of view of an IIS having three lighting control areas.

In some situations, it may be desirable to set one or more smaller areas of interest within a larger scene in the field of view of the IIS (see, e.g. FIG. 11). For example, an occupancy sensor may monitor individual cubicles within a larger office space to control lights at each cubicle. An occupancy sensor in this situation may only be in communication with lighting controls and may not be connected to a network or a computer for configuration. In an exemplary embodiment, it may be possible to configure and calibrate the system through interaction with the video stream information directly. Configuration and calibration may be done, for example, by "showing" a remote control device, LED, or imagery pattern to the sensor at each end or waypoint of the line or area to indicate where the line or area appears in the image scene. In an exemplary embodiment, the sensor may have a "learn" or "configure" mode, which may be activated, for example, by the person installing the device (the "installer"), through, for example, a button on the device or a remote control mechanism. While the in the "configure" mode, the device may detect the installer within its field of view. The installer may then move through the scene to set the boundaries of an area of interest (AOI) within the scene. For example, the installer may stop for a specified period of time at waypoints or vertices, then walk along lines that define the boundaries of the AOI. While the installer is walking, tracking algorithms within the sensor may detect the motion as area boundaries. When the installer stops for a period of time, the boundary of the AOI will be closed. The installer can use this technique to set multiple areas of interest or tripwires within the field of view of the sensor. The user can also set directional tripwires so that an accurate count can be made of objects going one way or the other.

In an exemplary embodiment, the sensor may use a first sensing modality such as a PIR or ultrasonic sensor as a mechanism to turn on a light or control some device or system. Then use the video processing technology to detect and track the movement of people or objects in the scene, output data depending on the actions of people or objects in the scene and, potentially turn off the lights or control some other device or system based on the video-derived data output. This might be necessary in situations where it is too dark for the video sensor to accurately detect the initial presence of people, thus requiring a first sensing modality to control the lights to enable the video-based application.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

We claim:

1. A sensing device, comprising:
    a video imager to obtain a video comprising a stream of video images within a field of view of the video imager;
    a processing unit having a processor to receive and process the stream of video images of said video from the video imager to count a number of at least one of humans or objects in the field of view of the video imager based solely on the video, wherein said process comprises: segmenting said at least one of humans or objects represented in at least one of said stream of video images, and tracking a movement of said at least one of humans or objects over said stream of video images; and
    a communication channel to output non-imagery signals based on the video and not to output images or video from the video imager, at least one of the non-imagery signals representing the counted number of said at least one of humans or objects in the field of view.

2. The sensing device of claim 1, wherein the processing unit processes the video to count the number of humans in the field of view of the video imager and wherein the at least one of the non-imagery signals represents the counted number of humans in the field of view.

3. The sensing device of claim 1, wherein the sensing device further comprises an output device, wherein the output device is at least one of a liquid crystal display, a light-emitting diode display, or an audio output and wherein the output device does not output video.

4. The sensing device of claim 1, wherein the sensing device further comprises a communication driver to communicate with one or more devices or systems external to the sensing device.

5. The sensing device of claim 4, wherein the communication driver communicates with at least one of a television, a personal computer, a cell phone, a web client, a network storage, or a central monitoring system.

6. The sensing device of claim 4, wherein the communication driver communicates with one or more components of an energy management system, including an air/water heating component, a ventilation component, an air conditioning component, or a window treatment control component.

7. The sensing device of claim 1, wherein the sensing device is a stand-alone device.

8. The sensing device of claim 1, wherein the sensing device is part of a remote monitoring system, a building automation system, an access control system, a business intelligence gathering system, an emergency responder system, or a traffic management system.

9. The sensing device of claim 1, further comprising an optical sensor to provide light level information to the processing unit.

10. The sensing device of claim 1, wherein the video imager comprises at least one of a color imager, a monochrome imager, a low light imager, a day/night infrared (IR) imager, a thermal imager, a thermal IR imager, a carbon-metal-oxide semiconductor (CMOS) imager, a charge-coupled device (CCD) imager, or special purpose video imager.

11. The sensing device of claim 1, further comprising an illuminator to illuminate the field of view with a range of light wavelengths, and wherein the video imager is sensitive to the range of light wavelengths of the illuminator.

12. The sensing device of claim 1, further comprising at least one physical control to configure and/or calibrate the sensing device.

13. The sensing device of claim 1, wherein the processing unit processes the video to further count the number of at least one of humans or objects entering the field of view and wherein the at least one of the non-imagery signals further represents the counted number of at least one of humans or objects entering the field of view.

14. The sensing device of claim 1, wherein the processing unit processes the video to further count the number of at least one of humans or objects exiting the field of view and wherein the at least one of the non-imagery signals further represents the counted number of at least one of humans or objects exiting the field of view.

15. The sensing device of claim 1, wherein the processing unit processes the video to further count the number of at least one of humans or objects entering and exiting the field of view and wherein the at least one of the non-imagery signals further represents the counted number of at least one of humans or objects entering and exiting the field of view.

16. The sensing device of claim 1, wherein the processing unit receives and processes the video from the video imager to identify an area and count a number of at least one of humans or objects in the area, wherein the area is a subset of the field of view of the video imager; and wherein the at least one of the non-imagery signals represents the counted number of at least one of humans or objects in the area.

17. The sensing device of claim 16, wherein the processing unit identifies the area based on movements of a person in the field of view of the video imager and tracking the movements of the person.

18. The sensing device of claim 17, wherein the processing unit identifies the area based on movements of the person walking a perimeter of the area.

19. The sensing device of claim 16, wherein the processing unit identifies the area based on the obtained video.

20. The sensing device of claim 16, wherein the processing unit processes the video to further count the number of at least one of humans or objects entering the area and wherein the at least one of the non-imagery signals further represents the counted number of at least one of humans or objects entering the area.

21. The sensing device of claim 16, wherein the processing unit processes the video to further count the number of at least one of humans or objects exiting the area and wherein the at least one of the non-imagery signals further represents the counted number of at least one of humans or objects exiting the area.

22. The sensing device of claim 16, wherein the processing unit processes the video to further count the number of at least one of humans or objects entering and exiting the area and wherein the at least one of the non-imagery signals further represents the counted number of at least one of humans or objects entering and exiting the area.

23. The sensing device of claim 1, wherein the processing unit receives and processes the video from the video imager to identify an area and count a number of at least one of humans or objects entering or exiting the area, wherein the area is a subset of the field of view of the video imager; and wherein the at least one of the non-imagery signals represents the counted number of at least one of humans or objects entering or exiting the area.

24. The sensing device of claim 23, wherein the processing unit processes the video to further count a number of at least one of humans or objects entering the area.

25. The sensing device of claim 23, wherein the processing unit processes the video to further count a number of at least one of humans or objects exiting the area.

26. The sensing device of claim 23, wherein the processing unit identifies the area based on movements of a person in the field of view of the video imager and tracking the movements of the person.

27. The sensing device of claim 26, wherein the movements of the person comprise walking the perimeter of the area.

28. The sensing device of claim 23, wherein the processing unit identifies the area based on the obtained video.

29. The sensing device of claim 1 further comprising:
a user-activated hardware mechanism to initiate a configuration mode for the sensing device.

30. A method of monitoring a scene, comprising:
receiving video data about the scene from a video imager;
activating a learn mode of a processing unit having a processor;
configuring said monitoring by defining an area of interest in the scene with the processing unit based solely on tracking a configuration person or a configuration object in the scene from the video data, while the learn mode is activated;
subsequently counting a number of at least one of humans or objects in relation to the area of interest based solely on the area of interest and the video data by the processing unit, while the learn mode is deactivated; and
outputting non-imagery signals based on the video and not outputting images or video from the video imager, at least one of the non-imagery signals representing the counted number of at least one of humans or objects.

31. The method of claim 30, wherein the number of at least one of humans or objects entering the area of interest are counted.

32. The method of claim 30, wherein the number of at least one of humans or objects exiting the area of interest are counted.

33. The method of claim 30, wherein the number of at least one of humans or objects entering and exiting the area of interest are counted.

34. The method of claim 30, wherein the number of humans in relation to the area of interest are counted.

35. The method of claim 30, wherein outputting the signal comprises outputting the signal to at least one of a remote monitoring system, a building automation system, an access control system, a business intelligence gathering system, an emergency responder system, or a traffic management system.

36. The method of claim 35, wherein outputting the signal comprises outputting the signal to at least one of one or more components of an energy management system, including an air/water heating component, a ventilation component, an air conditioning component, or a window treatment control component.

37. The method of claim 30, wherein outputting a signal comprises outputting the signal to at least one of a local computer, a television, a set top box, a router, a cellular telephone, a remote computer, or a remote monitoring center.

38. A sensing device, comprising:
a video imager to obtain video within a field of view of the video imager;
a processing unit having a processor to:
configure by receiving and processing the video from the video imager to identify a tripwire based solely on tracking a configuration person or a configuration object in the field of view of the video imager, and to define a specified direction of crossing the tripwire based solely on tracking the configuration person or the configuration object in the field of view of the video imager, and
subsequently count a number of at least one of humans or objects crossing the tripwire in the specified direction based solely on the video, the tripwire, and the specified direction of crossing the tripwire; and
a communication channel to output non-imagery signals based on the video and not to output images or video from the video imager, at least one of the non-imagery signals representing the number of tripwire crossings in the specified direction.

39. The sensing device of claim 38, wherein the processing unit identifies the tripwire and defines the specified direction of crossing the tripwire based on tracking movements of the configuration person or the configuration object in the field of view of the video imager and on an orientation of the configuration person or the configuration object in the field of view of the video imager.

40. The sensing device of claim 39, wherein the movements of the configuration person or the configuration object comprise walking along the path of the tripwire.

41. The sensing device of claim 38, wherein the number of humans crossing the tripwire in a specified direction are counted.

* * * * *